United States Patent [19]
Nakamura et al.

[11] Patent Number: 5,829,927
[45] Date of Patent: Nov. 3, 1998

[54] DRILL AND THROWAWAY TIP

[75] Inventors: Shinichi Nakamura; Takashi Kubota; Nobuyuki Takagi, all of Gifu-ken, Japan

[73] Assignee: Mitsubishi Materials Corporation, Tokyo, Japan

[21] Appl. No.: 822,514

[22] Filed: Mar. 24, 1997

[30] Foreign Application Priority Data

| Apr. 30, 1919 | [JP] | Japan | 8-109606 |
| Mar. 28, 1996 | [JP] | Japan | 8-074893 |
| Oct. 19, 1996 | [JP] | Japan | 8-284417 |

[51] Int. Cl.⁶ ...................................................... B23B 51/02
[52] U.S. Cl. .......................... 408/230; 408/233; 408/713; 407/113
[58] Field of Search ...................................... 408/187, 188, 408/204, 233, 227, 230, 713; 407/113, 114

[56] References Cited

U.S. PATENT DOCUMENTS

| 4,373,839 | 2/1983 | Negishi et al. | 408/223 |
| 4,687,388 | 8/1987 | Yokota et al. | 408/230 |
| 5,092,718 | 3/1992 | Shallenberger | 408/188 |

FOREIGN PATENT DOCUMENTS

| 2 145 291 | 2/1973 | France . | |
| 28 16 150 | 10/1979 | Germany . | |
| 1421189 | 6/1991 | Japan | 408/230 |
| L01850 | 5/1911 | United Kingdom . | |
| 2 157 989 | 11/1985 | United Kingdom . | |

OTHER PUBLICATIONS

European Search Report, dated Jul. 29, 1997.

*Primary Examiner*—Daniel W. Howell
*Attorney, Agent, or Firm*—Cushman Darby & Cushman IP Group of Pillsbury Madison & Sutro LLP

[57] ABSTRACT

A drill including a substantially columnar tool body having an axis. The tool body includes a pair of chip ejection grooves formed in an outer peripheral surface thereof. The tool body further includes, in a distal end portion thereof, a pair of cutting edges provided at respective distal ends of the pair of chip ejection grooves and a recess communicating with the pair of chip ejection grooves. The pair of cutting edges have radially inner ends located in positions slightly offset from the axis radially outward, and the recess extends along the axis while passing a gap between the radially inner ends of the pair of cutting edges, and has a bottom surface facing a distal end of the tool body. The bottom surface of the recess includes one slope and another slope. The one slope obliquely crosses the axis in a position aligned with the axis and inclines toward one of the pair of chip ejection grooves as the one slope proceeds to a side near a base end of the tool body, and the other slope crosses the one slope on a side near the distal end of the tool body and inclines toward another of the pair of chip ejection grooves as the other slope proceeds to the side near the base end of the tool body.

16 Claims, 8 Drawing Sheets

DRILL AND THROWAWAY TIP

BACKGROUND OF THE INVENTION

1. Field of the Invention

The present invention relates to a drill for use in drilling work and a throwaway tip suitably used with the drill.

2. Description of Related Art

It is generally known that, in drilling work using a drilling tool such as a drill, a great thrust load acts on a cutting edge near the center of rotation of a tool end because the rotational speed of the tool is zero (0) on an axis aligned with the center of rotation of the tool. To abate such a great thrust load, Japanese Unexamined Utility Model Publication No. 56-76307 and No. 56-76308, for example, propose a drill wherein radially inner ends of a pair of cutting edges provided at the distal end of a tool body are located away from the axis of the tool body, and a concave recess along the axis is formed between the radially inner ends of the cutting edges.

In the above proposed drill, no thrust loads act on the cutting edges because the cutting edges are absent from the center of rotation of the tool end and thereabout at which the rotational speed of the tool is zero (0). Further, the drill disclosed in the above-cited Japanese Unexamined Utility Model Publications 56-76307 and 56-76308, both herein incorporated by reference, has a slope formed at a bottom surface of the recess to incline toward one of a pair of chip ejection grooves, which are formed in the tool body, as it comes closer to the base (rear) side of the tool body while obliquely crossing the axis of the tool body. Therefore, even when a material left after cutting of a workpiece between the radially inner ends of the cutting edges grows in the form of a columnar core and extends in the recess along the axis of the tool body, the core is guided by the slope and bent toward one of the chip ejection grooves when reaching the bottom surface of the recess. The core is then twisted off and ejected with rotation of the tool body. Accordingly, such a core will not be left in a drilled hole.

In the above proposed drill, however, a portion of the bottom surface of the recess on the side close to the other of the chip ejection grooves is cut and chamfered into a flat surface perpendicular to the axis. Therefore, if the core grows toward the other of the chip ejection grooves away from the axis, the tip end of the core bumps against the flat surface and is not guided by the slope any more, resulting in a fear that the core may jam in the recess. The core is more likely to jam when the core is hard to twist off in an appropriate length and has a tendency to grow away from the axis, as experienced, e.g., particularly in the case of drilling soft materials. If the core jams in the recess, a subsequent growing core bumps against the jammed core, causing successive core to be accumulated in the recess one after another. This may give rise to trouble in the drilling work or increase the thrust load remarkably. In the worst case, the tool life may be decreased due to damage of the tool. Such a failure in smooth ejection of the core also leads to a fear that the tool may become hard to advance straight and may tend to vibrate more easily, producing louder noises and decreasing the precision of a drilled hole.

Meanwhile, in some of drills for use in drilling work, a throwaway tip is detachably attached to the distal end of a tool body. Such a known throwaway tip and drill are disclosed in, for example, Japanese Unexamined Patent Publication No. 4-269108, herein incorporated by reference.

The drill disclosed in the above-cited Japanese Unexamined Patent Publication includes a throwaway tip attached to a tip mount seat formed at the distal end of a tool body rotatable about its axis. The throwaway tip is in the form of an equilateral-triangular plate. One of two triangular surfaces and one side face of the tip plate cross each other at a right angle, and a cutting edge is formed along a ridge between the one triangular surface and the one side face. The tip is mounted such that the one triangular surface is located as a rake face to face in the rotating direction of the drill, and the one side face is located as an end flank to face the distal end of the tool body. The cutting edge is given a negative radial rake angle, and has a radially inner portion formed to curve in a convex shape toward the other triangular surface which is seated on the tip mount seat, i.e., backward in the rotating direction of the drill. Incidentally, a chip breaker groove is defined in a verge portion of the one triangular surface as a rake face.

With the drill thus constructed, because the radially inner portion of the cutting edge is formed to curve in a convex shape as stated above, the cutting edge can have high strength near the center of rotation of the drill which is subjected to an extremely great cutting load.

In the above drill, however, since the triangular surfaces and the side faces of the throwaway tip are formed in orthogonal relation, a ridge at which the above one side face as a flank and another one side face adjacent the one side face at a radially outer end of the cutting edge cross each other is also formed to extend in the direction perpendicular to both the above one triangular surface as a rake face and the cutting edge.

Accordingly, to keep the aforesaid crossing ridge away from the inner peripheral surface of a hole drilled by the cutting edge, the cutting edge of the above drill must be given a negative radial rake angle. This allows the throwaway tip to contact the inner peripheral surface of the drilled hole only at a corner of the above one triangular surface corresponding to the radially outer end of the cutting edge. Therefore, when the drill is driven at a high feed speed, the finish precision of the inner peripheral surface of the drilled hole is deteriorated. Another problem of the proposed drill is that since the throwaway tip contacts the drilled hole only at one corner thereof as stated above, drill guide against deflections in the radial direction is more likely to degrade, making it difficult to carry out drilling with high straight-cut precision. Further, since the corner of the above one triangular surface, as a rake face, corresponding to the radially outer end of the cutting edge has an acute angle, the strength of the cutting edge is insufficient even with the rake face and the flank crossing each other at a right angle, resulting in a cutting edge which may be damaged more easily.

On the other hand, in drilling work using the proposed drill, a chip produced incident to the drilling is longer on the radially outer side than on the radially inner side of the cutting edge, because the cutting edge extends from the inner peripheral side to the outer peripheral side of the tool body and the radius of rotation about the axis differs at different positions along the cutting edge. In the above throwaway tip, however, the chip breaker groove formed in the verge portion of the above one triangular surface, as a rake face, for treating chips has a uniform shape over the entire length of the cutting edge and hence cannot provide a sufficient ability of effectively treating the chips produced, in particular, on the radially outer side of the cutting edge.

Moreover, in the above throwaway tip, because the rake face and the flank cross each other at a right angle, the cutting edge has an axial rake angle set as a negative angle and the rake face is located to incline in the rotating direction of the drill as it proceeds backward axially of the drill. Therefore, chips produced by the cutting edge are once pushed in the rotation direction of the drill and then discharged into a chip ejection groove for ejection of the chips toward the base (rear) side of the tool body in the axial direction. This results in less efficiency of the chip treatment.

SUMMARY OF THE INVENTION

This application is based on Japanese Application HEI 8-074893 filed Mar. 28, 1996, Japanese Application HEI 8-109606 filed Apr. 30, 1996, and Japanese Application HEI 8-284417 filed Oct. 25, 1996 the subject matters of which are hereby incorporated by reference as if fully set forth herein.

The present invention has been made in view of the background set forth above, and its first object is to provide a drill which can promptly eject produced cores from a recess and can perform drilling in a smooth and stable manner, even when soft materials are drilled.

To achieve the above first object, according to one aspect, the present invention provides a drill wherein:

the drill includes a substantially columnar tool body having an axis, the tool body having a pair of chip ejection grooves formed in an outer peripheral surface thereof, and the tool body also having, in a distal end portion thereof, a pair of cutting edges provided at respective distal ends of the pair of chip ejection grooves and a recess communicating with the pair of chip ejection grooves, the pair of cutting edges having radially inner ends located in positions slightly offset from the axis radially outward, and the recess extending along the axis while passing a gap between the radially inner ends of the pair of cutting edges, and having a bottom surface facing a distal end of the tool body, the bottom surface of the recess comprising one slope and the other slope, the one slope obliquely crossing the axis in a position aligned with the axis and inclining toward one of the pair of chip ejection grooves as the one slope proceeds to the side near a base end of the tool body, and the other slope crossing the one slope on the side near the distal end of the tool body and inclining toward the other of the pair of chip ejection grooves as the other slope proceeds to the side near the base end of the tool body.

Also, according to another aspect, the present invention provides a drill wherein:

the drill includes a substantially columnar tool body having an axis, the tool body having a pair of chip ejection grooves formed in an outer peripheral surface thereof, and the tool body also having, in a distal end portion thereof, a pair of cutting edges provided at respective distal ends of the pair of chip ejection grooves and a recess communicating with the pair of chip ejection grooves, the pair of cutting edges having radially inner ends located in positions slightly offset from the axis radially outward, and the recess extending along the axis while passing a gap between the radially inner ends of the pair of cutting edges, and having a bottom surface facing a distal end of the tool body, the bottom surface of the recess being formed by one slope extending between the pair of chip ejection grooves, and the one slope obliquely crossing the axis in a position aligned with the axis and inclining toward one of the pair of chip ejection grooves as the one slope proceeds to the side near a base end of the tool body.

Stated otherwise, in the drills of the present invention, the bottom surface of the recess facing the distal end of the tool body has the one slope inclining toward one of the chip ejection grooves after obliquely crossing the axis in a position aligned with the axis as the one slope proceeds to the side near the base end of the tool body. Therefore, even when a core is not twisted off and continues growing along the axis of the tool body to reach the bottom surface of the recess, the tip end of the core bumps against the one slope and then is guided by it. As a result, the core can be surely ejected through the one chip ejection groove.

Specifically, with the former drill according to one aspect wherein the bottom surface of the recess includes the other slope crossing the one slope on the side near the distal end of the tool body and inclining toward the other of the pair of chip ejection grooves as the other slope proceeds to the side near the base end of the tool body, even if the core grows away from the axis of the tool body toward the other chip ejection groove as experienced in the case of drilling soft materials, the grown core is guided by the other slope into the other chip ejection groove and then smoothly ejected therefrom, and hence a jamming of cores in the recess can be avoided. Also, with the latter drill according to another aspect wherein the one slope extends between the pair of chip ejection grooves, even if the core grows away from the axis of the tool body, it always bumps against the one slope and is guided into the one chip ejection groove for positive ejection. Accordingly, a jamming of cores can be avoided as with the former drill. Thus, with the drills of the present invention, cores are surely guided into and ejected through any one of the chip ejection grooves, and hence a jamming of cores in the recess is avoided. As a result, it is possible to prevent the tool body from being damaged due to increased thrust loads caused by a jamming of cores, and prevent the occurrence of vibrations and noises from a failure in straight motion of the tool body during the drilling, thereby achieving high-precision, stable drilling work.

A second object of the present invention is to provide a drill which can maintain the strength of a drill cutting edge in its radially inner portion, can improve finish precision of the inner peripheral surface of a drilled hole, can ensure sufficient strength of the cutting edge at its radially outer end, and can realize more efficient chip treatment, as well as a throwaway tip which is optimum for combined use with the drill.

To achieve the above second object, according to still another aspect, the present invention provides a drill wherein:

the drill comprises a tool body having an axis and being rotatable about the axis in a rotating direction, and a throwaway tip detachably attached to a distal end portion of the tool body, the throwaway tip being in the form of a substantially triangular plate having two triangular surfaces and three side faces, one of the triangular surfaces being positioned as a rake face to face in the rotating direction, one of the side faces being positioned as an end flank to face a distal end of the tool body, the throwaway tip having a cutting edge defined along a ridge between the rake face and the end flank, and the cutting edge having one end positioned near the center of rotation of the distal end of the tool body and the other end positioned at an outer periphery of the tool body, the cutting edge having a portion near one end thereof which one end portion is formed to incline backward in the rotating direction while drawing a convex shape as the cutting edge approaches the one end, and the cutting edge having a portion near the other end thereof which other end portion includes a cylindrical surface formed, in a crossing ridge portion between the one side face and other one of the side faces adjacent the one side face, to extend in the direction of the axis coaxially with the axis.

Also, the present invention provides a throwaway tip wherein:

the throwaway tip is in the form of a substantially triangular plate having two triangular surfaces and three side faces, one of the triangular surfaces serving as a rake face, one of the side faces serving as a flank, and the throwaway tip having a cutting edge defined along a ridge between the rake face and the flank, the cutting edge having a portion near one end thereof which one end portion is formed to incline toward the other of the triangular surfaces while drawing a convex shape as the cutting edge approaches the one end, and the cutting edge having a portion near the other end thereof which other end portion includes a cylindrical surface formed, in a crossing ridge portion between the one side face and other one of the side faces adjacent the one side face, to extend from the one side face to the other one side face while drawing a convex shape from the one triangular surface to the other triangular surface.

With the thus-constructed throwaway tip and the drill mounting the throwaway tip thereon, since the one end portion of the cutting edge positioned near the center of rotation of the distal end of the tool body is formed to incline toward the triangular surface on the opposite side, i.e., backward in the rotating direction of the drill, while drawing a convex shape as the cutting edge approaches the one end, the strength of the cutting edge at the one end can be surely maintained.

On the side near the other end of the cutting edge positioned at the outer periphery of the drill, the cylindrical surface drawing a convex shape is formed in the crossing ridge portion between the side faces of the throwaway tip located on the outer periphery of the drill to extend from the one side face to the other one side face of the throwaway tip coaxially with the axis. When drilling a hole by using the drill, therefore, the cylindrical surface is brought as a margin into contact with the inner peripheral surface of the drilled hole and develops a burnishing effect. This effect enables the inner peripheral surface of the drilled hole to be smooth-finished and the drill to achieve improved straight-cut.

Also, because of the provision of the cylindrical surface drawing a convex shape, the thickness of the throwaway tip can be increased in a corner on the side including the other end of the cutting edge. Further, since that cylindrical surface is formed to extend from the one side face to the other one side face of the throwaway tip, i.e., in the axial direction of the drill, it is possible to ensure the strength of the cutting edge at the other end thereof and prevent the cutting edge from being damaged.

Additionally, if the rake face and the flank cross each other at an acute angle, the cutting edge can have a rake angle set to 0° or a positive value. This is effective in not only promoting prompt ejection of chips but also mounting the throwaway tip to the tool body firmly.

DETAILED DESCRIPTION OF THE PREFERRED EMBODIMENTS

FIGS. 1 to 5 illustrate a first embodiment of a drill according to the present invention and FIGS. 6 to 9 illustrate a first embodiment of a throwaway tip according to the present invention. In the drill of this first embodiment and in drills of second and third embodiments described later, the present invention is applied to throwaway type drills in each of which a throwaway tip is detachably attached to the distal end of a tool body.

In the drill of this first embodiment, a tool body 1 is formed into a substantially columnar shape about its axis O. The tool body 1 has a pair of chip ejection grooves 2A, 2B which are formed in an outer peripheral surface of its distal end portion in symmetrical relation about the axis O such that the chip ejection grooves 2A, 2B are opened to a distal end face 1A of the tool body 1 and extend toward the base (rear) end of the tool body 1 while twisting round the axis O backward in the rotating direction T of the tool. Also, a supply path 3 for a lubricating and cooling agent or the like is formed in the tool body 1 and extends from a base end face 1B of the tool body 1 toward the distal end thereof along the axis O through a shank 1 C of the tool body 1 near the base end face 1B. The supply path 3 is branched near the distal end of the tool body 1 into two paths which are opened to the distal end face 1A. Further, tip mount seats 4, are formed at respective distal ends of the chip ejection grooves 2A, 2B and a throwaway tip 5 according to the first embodiment of present invention shown in FIGS. 6 to 9 is attached to each of the tip mount seats 4.

Figures 4, 6:
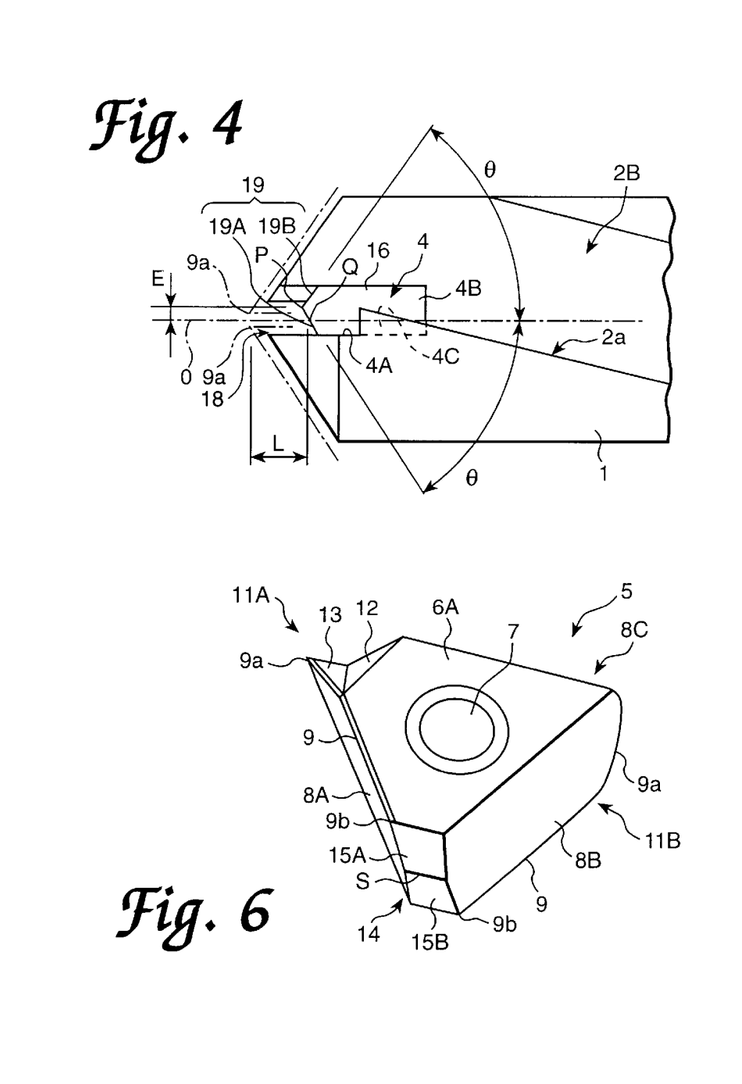
FIG. 4 is a side view of a distal end portion of a tool body of the drill shown in FIG. 1.
FIG. 6 is a perspective view showing a first embodiment of a throwaway tip according to the present invention, the throwaway tip being mounted to the drill shown in FIG. 1.
Figure 7:
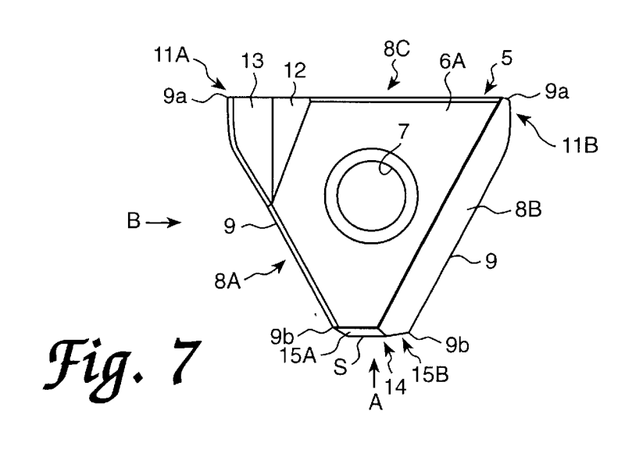
FIG. 7 is a plan view of the throwaway tip shown in FIG. 6.
Figure 8:
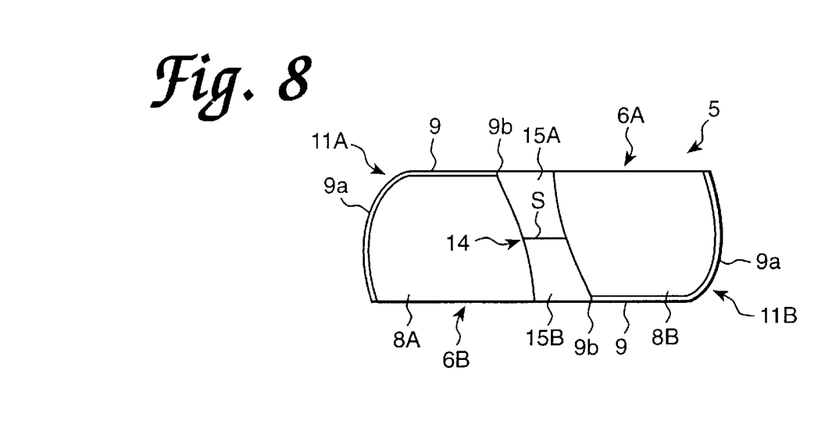
FIG. 8 is a side view of the throwaway tip shown in FIG. 7 as viewed in the direction of arrow A.

The throwaway tip 5 is made of hard materials such as hard metal in the form of a substantially equilateral- triangular plate (more strictly, an isosceles-trapezoidal plate). At the center of each of two triangular surfaces 6A, 6B of the throwaway tip 5, a mount hole 7 used for attaching the throwaway tip 5 to the tip mount seat 4 is formed to penetrate the throwaway tip 5 in the direction of thickness thereof.

One cutting edge 9 is defined along a ridge between one 6A of the triangular surfaces 6A, 6B and one 8A of three side faces 8A, 8B, 8C of the throwaway tip 5 crossing the triangular surfaces 6A, 6B, and another cutting edge 9 is defined along a ridge between another 6B of the triangular surfaces 6A, 6B and another 8B of the side faces 8A, 8B, 8C. In use of the throwaway tip 5, one of the cutting edges 9 is selected and employed for cutting or drilling work as a cutting edge of the abovementioned drill of the first embodiment. Further, in the throwaway tip 5, the triangular surface 6A and the side face 8A cross each other at an acute angle through the cutting edge 9, and the triangular surface 6B and the side face 8B cross each other at an acute angle through the cutting edge 9. Additionally, ridges between both the triangular surfaces 6A, 6B and the remaining one 8C of the side faces 8A, 8B, 8C are formed respectively to have chamfered portions 10.

Here, in a corner 11A of the above one triangular surface 6A at which the side face 8A and the side face 8C cross each other and in a corner 11B of the above other triangular surface 6B at which the side face 8B and the side face 8C cross each other, there are formed respectively flat slopes 12 which incline at a constant gradient toward the triangular surfaces 6B, 6A on the opposite side as they approach the pointed ends of the corners 11A, 11B, and cylindrical surfaces 13 which extend toward the triangular surfaces 6B, 6A on the opposite side while drawing convex curves as they approach the side face 8C defining the corners 11A, 11B, the flat slopes 12 and the cylindrical surfaces 13 being located in the order named toward the pointed ends of the corners 11A, 11B. The cylindrical surfaces 13, 13 formed in the corners 11A, 11B of the triangular surfaces 6A, 6B cross the side faces 8A, 8B to define portions of the cutting edges 9 near one end 9a thereof (i.e., near the side face 8C). As a result, the portions of the cutting edges 9 near the one end 9a thereof are formed to curve in a convex shape relative to the triangular surfaces 6B, 6A on an opposite side as they approach the one end 9a.

Figure 9:
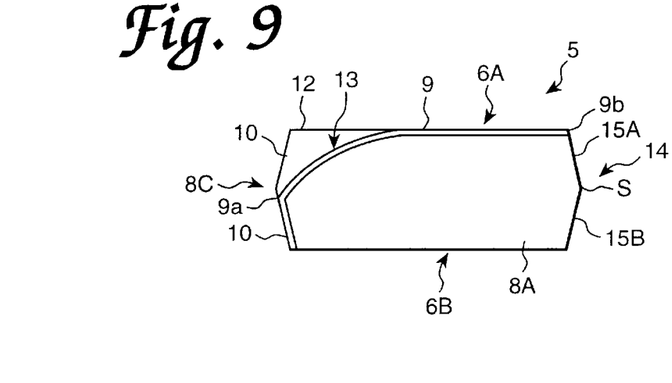
FIG. 9 is a side view of the throwaway tip shown in FIG. 7 as viewed in the direction of arrow B.

Further, at another end 9b of the cutting edges 9, two cylindrical surfaces 15A, 15B extending in a direction parallel to the remaining one side face 8C are formed in a crossing portion 14 between the one side face 8A and the other one side face 8B. With the cylindrical surfaces 15A, 15B thus formed, the throwaway tip 5 is in the form of, strictly speaking, an isosceles-trapezoidal plate as stated above. The first cylindrical surface 15A is formed on the side of the crossing portion 14 near the one triangular surface 6A, whereas the second cylindrical surface 15B is formed on the side of the crossing portion 14 near the other triangular surface 6B. Also, the cylindrical surfaces 15A, 15B are formed to bulge outward of the throwaway tip 5 while drawing convex curves as they come closer to the triangular surfaces 6B, 6A on the opposite side. The cylindrical surfaces 15A, 15B cross each other at an obtuse angle to define a crossing ridge S. The crossing ridge S is positioned in the crossing portion 14 at the middle in the direction of thickness of the throwaway tip 5 and extends in a direction perpendicular to the direction of thickness of the throwaway tip 5. Further, as shown in FIG. 9, looking at the throwaway tip 5 in the direction along the crossing ridge S, the cylindrical surfaces 15A, 15B are formed to cross the respective cutting edge 9 at an obtuse angle at the other end 9b thereof. Accordingly, the other end 9b of the cutting edges 9 are positioned at respective crossing points between the cutting edges 9 and the cylindrical surfaces 15A, 15B. In addition, each of the first and second cylindrical surfaces 15A, 15B has a radius of curvature set equal to an inner diameter of a hole cut by the drill of this first embodiment.

Figure 5:
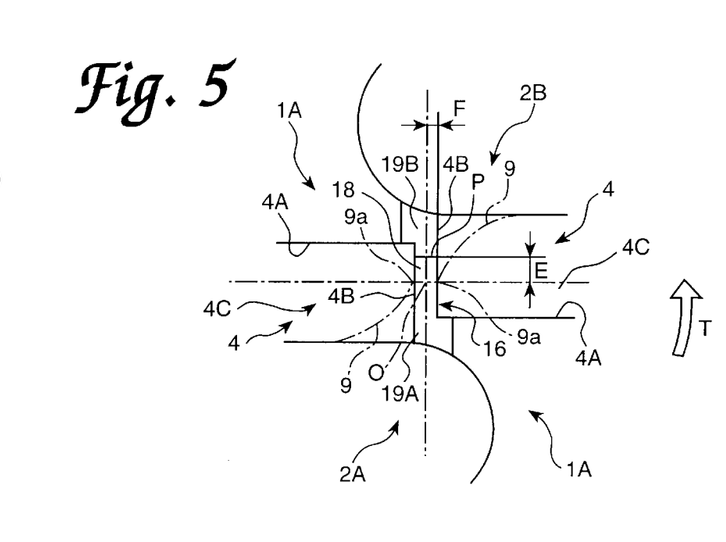
FIG. 5 is an enlarged front view of the distal end portion of the tool body of the drill shown in FIG. 1, the view showing a portion around an axis O.

On the other hand, as shown in FIGS. 4 and 5, the tip mount seats 4 of the drill, to which the throwaway tips 5 are attached, are each defined by a bottom surface 4A recessed one step from a wall surface 2a of the chip ejection groove 2A or 2B positioned to face in the rotating direction T, and wall surfaces 4B, 4C rising from the bottom surface 4A to face respectively the outer peripheral surface and the distal end of the tool body 1. A threaded hole (not shown) is formed in the bottom surface 4A. The wall surface 4B is formed parallel to the axis O of the tool body 1, and the wall surface 4C is formed to incline such that it extends toward the side of the tool distal end as approaching the outer peripheral surface of the tool body 1 and also toward the side of the tool distal end as rising from the bottom surface 4A. Further, the wall surfaces 4B of the two tip mount seats 4 are formed in positions offset equal distances from the axis O of the tool body 1 toward the outer peripheral surface thereof. A thin wall 16 having a thickness equal to the distance between the wall surfaces 4B is thus formed between the wall surfaces 4B. Accordingly, the wall 16 is formed such that looking from the side of the tool distal end in the direction of the axis O, it extends between both the chip ejection grooves 2A, 2B perpendicular to the bottom surfaces 4A of the tip mount seats 4 as shown in FIG. 5, and looking in the direction opposed to the wall surface 4B, it extends in the direction of the axis O as shown in FIG. 4.

The throwaway tips 5 are seated on the thus-fabricated tip mount seats 4 as follows. One of the triangular surfaces 6A, 6B is positioned as a rake face to face in the rotating direction T, and the other of the triangular surfaces 6A, 6B is held in close contact with the bottom surface 4A of the tip mount seat 4. The side face 8C is positioned in abutment against the wall surface 4B to extend parallel to the axis O. One of the side faces 8A, 8B is positioned as an end flank to face the side of the tool distal end, and the other of the side faces 8A, 8B is positioned in abutment against the wall surface 4C. Then, the throwaway tip 5 is fixed to the tool body 1 by inserting a clamp screw 17 to the mount hole 7 and tightening it into the threaded hole formed in the bottom surface 4A. Note that the throwaway tips 5 attached to the tip mount seats 4 are the same in both size and shape and are mounted in symmetrical relation about the axis O.

Figure 1:
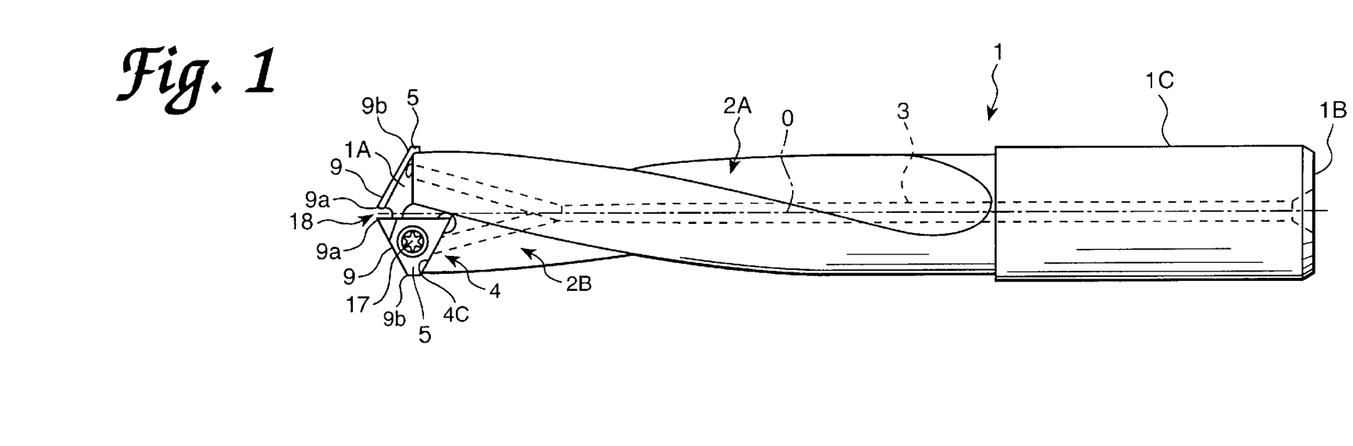
FIG. 1 is a plan view showing a first embodiment of a drill according to the present invention.
Figure 2:
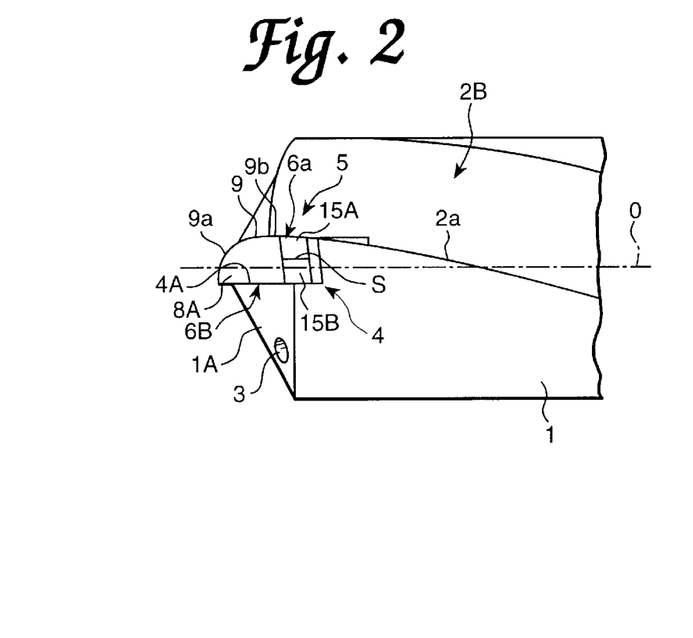
FIG. 2 is a side view of a distal end portion of the drill shown in FIG. 1.
Figure 3:
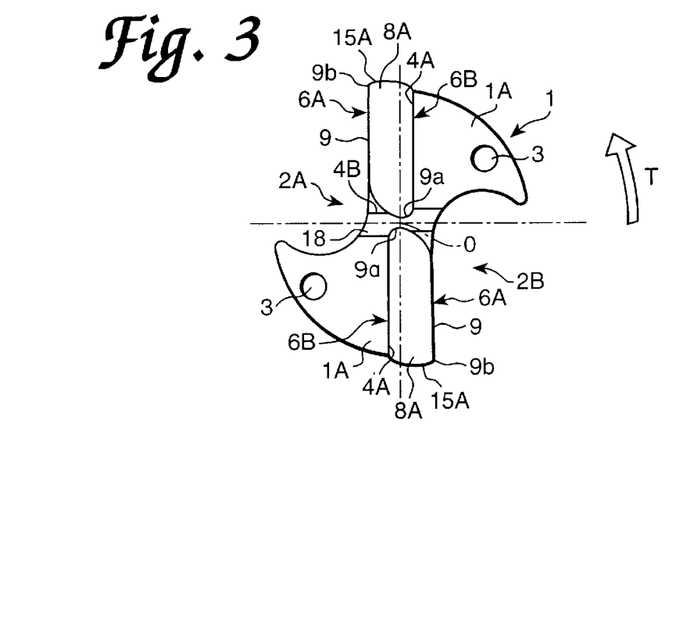
FIG. 3 is a front view of the distal end portion of the drill shown in FIG. 1.

In a state of the throwaway tips 5 being mounted as described above, the cutting edges 9 each defined along the crossing ridge between one of the triangular surfaces 6A, 6B, as a rake face, and one of the side faces 8A, 8B, as a flank, are each located such that the one end 9a is positioned on the side corresponding to the distal end and the inner periphery of the tool, and the cutting edge inclines toward the side of the tool base end as it proceeds from the one end 9a to the other end 9b. Also, corresponding to the wall surfaces 4B, 4B of the tip mount seats 4 being offset from the axis O, the one ends 9a of the cutting edges 9 of the throwaway tips 5 defined by the radially inner ends thereof are located in positions slightly offset from the axis O radially outward. In the drill of this first embodiment, the cutting edges 9 are each given an axial rake angle of 0° or a positive value as shown in FIG. 2, and a negative radial rake angle as shown in FIG. 3. Further, the tip end angle defined by the cutting edges 9 is set to about 120°.

The wall 16 formed between the wall surfaces 4B of the tip mount seats 4 has an end face which faces the side of the tool distal end and is retracted from the distal end face 1A toward the side of the tool base end as shown in FIG. 4. In the state of the throwaway tips 5 being attached to the tip mount seats 4, therefore, a recess 18 concaved toward the base end of the tool along the axis O and communicating with the chip ejection grooves 2A, 2B is defined between the side faces 8C of the throwaway tips 5 corresponding to the retraction of the wall 16. Thus, the end face of the wall 16 facing the side of the tool distal end serves as a bottom surface 19 of the recess 18.

In the drill of this first embodiment, the bottom surface 19 is formed by one slope 19A which inclines toward the one chip ejection groove 2A as it comes closer to the base end of the tool, and the other slope 19B which crosses the one slope 19A and inclines toward the other chip ejection groove 2B as it comes closer to the base end of the tool. Of the two slopes 19A, 19B, the one slope 19A is formed to extend from a position offset from the axis O nearer to the other chip ejection groove 2B toward the one chip ejection groove 2A while obliquely crossing the axis O.

Here, in the drill of this first embodiment, the one slope 19A is formed as a flat surface inclining at a certain angle q with respect to the axis O, and the inclination angle q is set in the range of 30° to 75°. The other slope 19B in the drill is also formed as a flat surface inclining at the same angle as the inclination angle q of the one slope 19A. Further, in the drill, a distance L from the distal end of the cutting edge 9 of the throwaway tip 5, i.e., the one end 9a of the cutting edge 9, to a crossing point Q between the one slope 19A and the axis O in the direction of the axis O is set in the range of 1 mm to 10 mm, as shown in FIG. 4. Note that, in FIG. 4 and FIGS. 10 and 11 described later, the path along which the cutting edge 9 and the one end 9a thereof rotate about the axis O is indicated by one-dot-chain lines.

Since the one slope 19A is formed to extend from the position offset from the axis O nearer to the other chip ejection groove 2B toward the one chip ejection groove 2A, a crossing ridge P between the slopes 19A and 19B is defined in a position offset from the axis O nearer to the other chip ejection groove 2B as shown in FIGS. 4 and 5. Then, a distance E from the crossing ridge P to the axis O is set larger than a distance F from the axis O to the radially inner end of the cutting edge 9 of the throwaway tip 5, i.e., the one end 9a of the cutting edge 9. In the illustrated drill, the distance F from the axis O to the one end 9a of the cutting edge 9 is set in the range of 0.1 mm to 1.25 mm.

In the drill of this embodiment constructed as described above, the cutting edges 9 of the throwaway tips 5 attached to the tip mount seats 4 are located such that the one end 9a of the cutting edges 9, i.e., the radially inner ends thereof, are offset from the axis O, thrust loads acting on the cutting edges 9 can be reduced as compared with the conventional drill as stated before, and a material left after cutting of a workpiece between both the one ends 9a of the cutting edges 9 grows in the form of a columnar core along the axis O and is received in the recess 18. Also, since the bottom surface 19 of the recess 18 has the one slope 19A inclining toward the one chip ejection groove 2A after obliquely crossing the axis O in a position aligned with the axis O as it comes closer to the side of the tool base end, the core is guided by the slope 19A into the chip ejection groove 2A and then ejected promptly therefrom even when the core continues growing along the axis O and reaches the bottom surface 19 of the recess 18.

Further, in the above illustrated drill, the bottom surface 19 of the recess 18 is formed by the one slope 19A and the other slope 19B which crosses the one slope 19A at the crossing ridge P and inclines toward the other chip ejection groove 2B as it comes closer to the base end of the tool. Therefore, even if the core grows away from the axis O of the tool body 1 toward the other chip ejection groove 2B as experienced, e.g., in the case of drilling soft materials, the grown core is guided by the other slope 19B into the other chip ejection groove 2B and then ejected therefrom. Problems such as a jamming of cores are thus avoided and hence high-precision, stable drilling work can be maintained. As a result, according to the drill of this first embodiment, it is possible to prevent cores from accumulating and jamming in the recess 18, prevent the tool from being damaged due to increased thrust loads caused by a jamming of the cores, and ensure straight motion of the tool during drilling to suppress vibration and noise, thereby achieving high-precision, stable drilling work.

In the above illustrated drill, since the distance E from the axis O to the crossing ridge P is set larger than the distance F from the axis O to one of the ends 9a of the cutting edges 9 and the distance F corresponds to the radius of the columnar core, the tip end of the core always bumps against the slope 19A when the core grows along the axis O. Accordingly, whenever cores normally grow along the axis O, the grown cores can be surely guided into the other chip ejection groove 2B and then ejected therefrom. Thus, in combination with the effect of the other slope 19B, cores can be guided into either one of the chip ejection grooves 2A, 2B for positive ejection regardless of the direction the cores grow.

In the above drill, since the distance L from the one ends 9a of the cutting edges 9 provided by the distal ends thereof to the crossing point Q between the one slope 19A and the axis O is set in the range of 1 mm to 10 mm, it is possible to more smoothly eject cores, ensure the strength of the distal end portion, in particular, of the tool body 1, and surely prevent damage of the tool. More specifically, if the distance L is smaller than the above range and the depth of the recess 18 to the one slope 19A of the bottom surface 19 is too shallow, the produced core would be hard to break off because it would reach the slope 19A prematurely while it is still short. This results in a fear that smooth ejection of cores would not be achieved and the tool would be more likely to cause vibration and noise. Conversely, if the distance L is greater than the above range and the recess 18 is too deep, the distal end portion of the tool body 1 would be cut away by the recess 18 to such a large extent that the rigidity and strength of the distal end portion of the tool body 1 would be deteriorated. This results in a fear that the tool body 1 would tend to damage more easily.

Furthermore, in the above illustrated drill, since the inclination angle q of the one slope 19A with respect to the axis O is set in the range of 30° to 75°, this also contributes to achieving positive ejection of cores and ensuring the rigidity and strength of the distal end portion of the tool body 1. More specifically, if the inclination angle q is greater than the above range, the one slope 19A would become similar to a flat surface crossing the axis O at a right angle; i.e., it would become a surface upstanding with respect to the direction in which cores grow. This results in a fear that the cores bumping against the one slope 19A would not be smoothly ejected through the chip ejection groove 2A. Conversely, if the inclination angle q is smaller than the above range, the distance from the crossing point Q to the chip ejection groove 2A over the one slope 19A would be too long; i.e., the recess 18 would be too deep. This results in a fear that the rigidity of the distal end portion of the tool body 1 may be insufficient.

On the other hand, in each of the above-described throwaway tips 5 of this first embodiment, since the first and second cylindrical surfaces 15A, 15B are formed 15A, 15B are formed at the other ends 9b of the cutting edges 9 provided by the radially outer ends thereof and each have a radius of curvature set equal to the inner diameter of a hole cut by the drill of this first embodiment, one of the cylindrical surfaces 15A, 15B which crosses the cutting edge 9 in use can serve as a margin of the drill. Therefore, contact of the margin with the inner peripheral surface of the drilled hole develops a burnishing effect, enabling the inner peripheral surface of the drilled hole to be smooth-finished. In addition, since the distal end portion of the tool body 1 is advanced while being guided by the margins of both the throwaway tips 5 along the drilled hole, it is possible to realize the drilled hole with high precision of the finished surface and straight-cut.

In the above illustrated throwaway tip 5, since the cylindrical surfaces 15A, 15B are formed to not only cross the cutting edges 9 at an obtuse angle, but also cross each other at an obtuse angle at the crossing ridge S, the cylindrical surfaces 15A, 15B are each located such that one cylindrical surface is positioned inside an extended curved plane of the other cylindrical surface. Regardless of which one of the cutting edges 9 is used, therefore, there is a gap between one cylindrical surface and the inner peripheral surface of the drilled hole, such that the other cylindrical surface is held as a margin in sliding contact with the inner peripheral surface of the drilled hole. Thus, the above one cylindrical surface is prevented from interfering with the drilled hole.

Also, in the above illustrated throwaway tip 5, the one ends 9a of the cutting edges 9 of the throwaway tip 5 are each formed to curve in a convex shape from one of the triangular surfaces 6A, 6B, as a rake face, toward the other triangular surface on the opposite side; in other words, the one ends 9a of the cutting edges 9 provided by the radially inner ends thereof and located on the side of the tool distal end are formed to convex in the rotating direction T of the tool. Therefore, the cutting edges can have high strength near the center of rotation of the tool where great thrust loads act, particularly during drilling, and the cutting edges 9 can be prevented from being damaged at the one ends 9a thereof. Further, at the other ends 9b of the cutting edges 9, the first and second cylindrical surfaces 15A, 15B are formed such that each of the cylindrical surfaces crosses a corresponding one of the cutting edges 9 at an obtuse angle and extends in the direction parallel to the side face 8C, i.e., in the direction parallel to the axis O. Accordingly, the throwaway tip 5 can surely have a sufficient thickness in the rotating direction T of the tool at the opposite ends 9b of the cutting edges 9 as well, and the cutting edges 9 can be given a high amount of strength to prevent them from being damaged. As a result, the above illustrated throwaway tip 5 enables the cutting edges 9 to have increased strength as a whole, makes the drill sufficiently adaptable for high-speed feed, and can achieve efficient drilling.

Moreover, in the above illustrated throwaway tip 5, since the triangular surfaces 6A, 6B each serving as a rake face in use and the side faces 8A, 8B crossing the triangular surfaces 6A, 6B through the cutting edges 9 and each serving as an end flank in use are formed to cross each other at an acute angle, the side face as an end flank can be given a flank angle even when the triangular surface as a rake face is arranged in the direction parallel to the axis O or in a direction to incline backward in the rotating direction T of the tool as it comes closer to the side of the tool base end. This enables the cutting edge 9 used in drilling to have an axial rake angle of 0° or a positive value as mentioned above. Therefore, chips produced by the cutting edge 9 avoid being pushed in the rotating direction T unlike the case in which the cutting edge has a negative axial rake angle. Thus, the chips are smoothly guided along the triangular surface as a rake face, promptly received in the chip ejection grooves 2A, 2B, and then ejected toward the side of the tool base end. Consequently, efficient chip treatment can be achieved.

In addition, since the triangular surfaces 6A, 6B and the side faces 8A, 8B cross each other at an acute angle, one of the side faces 8A, 8B of the throwaway tip 5 which faces toward the base end of the tool is inclined toward the base end of the tool as it approaches the other of the triangular surfaces 6A, 6B which is seated on the bottom surface 4A of the tip mount seat 4. On the other hand, the wall surface 4C of the tip mount seat 4 facing toward the distal end of the tool, against which the above one side face abuts, is formed to incline toward the distal end of the tool as it rises from the bottom surface 4A of the tip mount seat 4 as described before. According to the above illustrated drill, therefore, when the throwaway tip 5 is pushed toward the side of the tool base end by a component of feed force caused by a cutting force during drilling which acts in the direction of the axis O toward the side of the tool base end, there occurs a wedging effect by cooperation of the above one side face and the triangular surface, as a seating surface, of the throwaway tip 5 with the wall surface 4C and the bottom surface 4A of the tip mount seat 4. As a result, the throwaway tip 5 can be firmly held in place.

Since the above illustrated throwaway tip 5 has the cutting edges 9 defined along the respective ridges between the triangular surfaces 6A, 6B and the side faces 8A, 8B, the two cutting edges 9 can be employed for each throwaway tip 5.

Furthermore, since the cylindrical surfaces 15A, 15B are formed in the crossing portion 14 between the side faces 6A, 6B to cross the other ends 9b of the cutting edges 9 at the same angle, the positional relationship between the cutting edge 9 and the corresponding cylindrical surface remains unchanged even when, after using one of the cutting edges 9, the other cutting edge is employed. Accordingly, regardless of which one of the cutting edges 9 is employed, it is possible to maintain the same conditions in use. In other words, the advantages of the present invention can be equally achieved in either case. While the drill of the first embodiment has been described as defining the pair of cutting edges 9 on the throwaway tip 5 detachably attached to the tip mount seat 4, a tip having one cutting edge 9 formed thereon, for example, may be fixed to the tip mount seat 4 by brazing.

Also, while the portions of the cutting edges 9 near the one ends 9a thereof are each formed in the above illustrated throwaway tip 5 to curve in a convex shape relative to the triangular surface on the opposite side, i.e., backward in the rotating direction T, as it approaches the one end 9a, the edge shape is not limited to such a continuous curve so long as the portions of the cutting edges 9 near the one ends 9a thereof are each formed into a convex shape. For example, the portions of the cutting edges 9 near the one ends 9a thereof may be formed by successively linking short linear lines so as to draw a convex shape as a whole.

Figure 10:
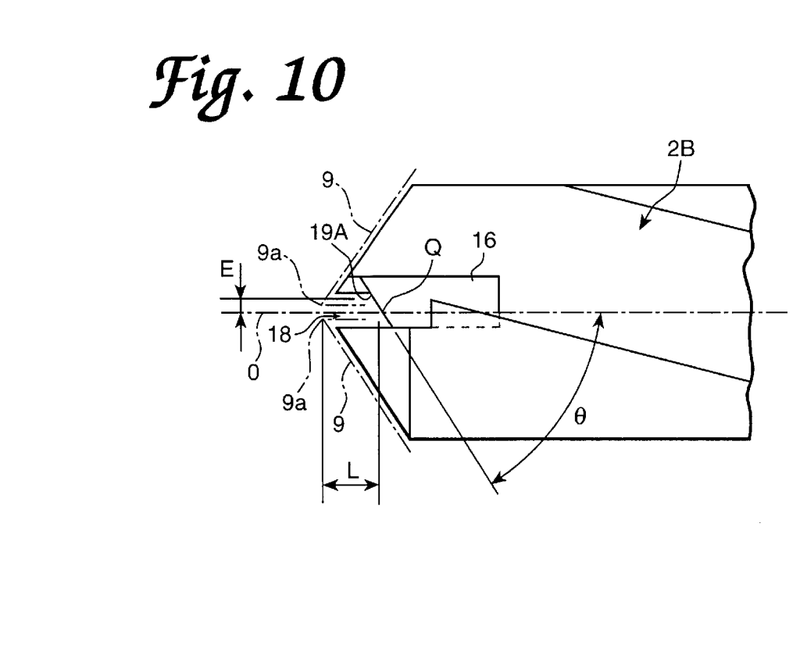
FIG. 10 is a side view of a distal end portion of a tool body, the view showing a second embodiment of the drill according to the present invention.

FIG. 10 shows the tool body 1 of a drill according to a second embodiment of the present invention. Compared to the drill of the above first embodiment, the bottom surface 19 of the recess 18 is formed by only one slope 19A which extends from the one chip ejection groove 2A to the other chip ejection groove 2B to entirely cover the space between them and inclines toward the one chip ejection groove 2A as it proceeds from the side of the tool distal end toward the side of the tool base end. Note that, in the drill of this second embodiment shown in FIG. 10 and a later-described drill of a second embodiment shown in FIG. 11, components common to those in the drill of the above first embodiment are denoted by the same reference numerals and will not be described below.

In the drill of this second embodiment having the above feature, even when the wall 16 is thick, i.e., the spacing between the one ends 9a of the cutting edges 9 positioned at the distal end of the tool is large, and relatively fat cores are produced, or even if cores grow offset from the axis O to a large extent, the tip ends of the cores always bump against the one slope 19A and then are guided toward the one chip ejection groove 2A. It is therefore possible to surely prevent the cores from jamming and promptly eject the cores through the one chip ejection groove 2A.

Figure 11:
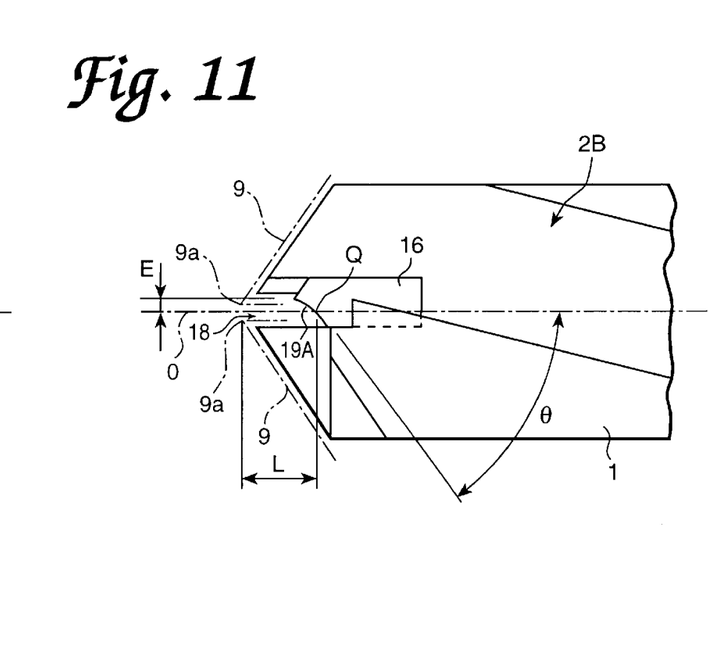
FIG. 11 is a side view of a distal end portion of a tool body, the view showing a third embodiment of the drill according to the present invention.

In the drills of the first and second embodiments, the one slope 9A is a flat surface which is easy to fabricate, and serves to surely guide the cores toward the chip ejection groove 2A. Alternatively, the one slope 9A may be formed as a curved surface like the tool body 1 of the drill according to the third embodiment, for example, as shown in FIG. 11. This modification is effective in smoothly introducing cores to the chip ejection groove 2A and further reducing the thrust loads. While the one slope 19A is in the form of a concave surface in the drill of the third embodiment shown in FIG. 11, it may be formed into a convex surface, or a concave or convex spherical or conical surface.

Further, in the above drills of the first to third embodiments, the one slope 19A is inclined toward the chip ejection groove 2A while extending in a direction perpendicular to the bottom surfaces 4A of the tip mount seats 4 (i.e., a direction perpendicular to the linear portions of the cutting edges 9), looking from the side of the distal end in the direction of the axis O. But the one slope 19A may be formed to incline with respect to the bottom surfaces 4A as well. In this case, the crossing ridge P between the slopes 19A, 19B is located obliquely with respect to the linear portions of the cutting edges 9.

Figure 12:
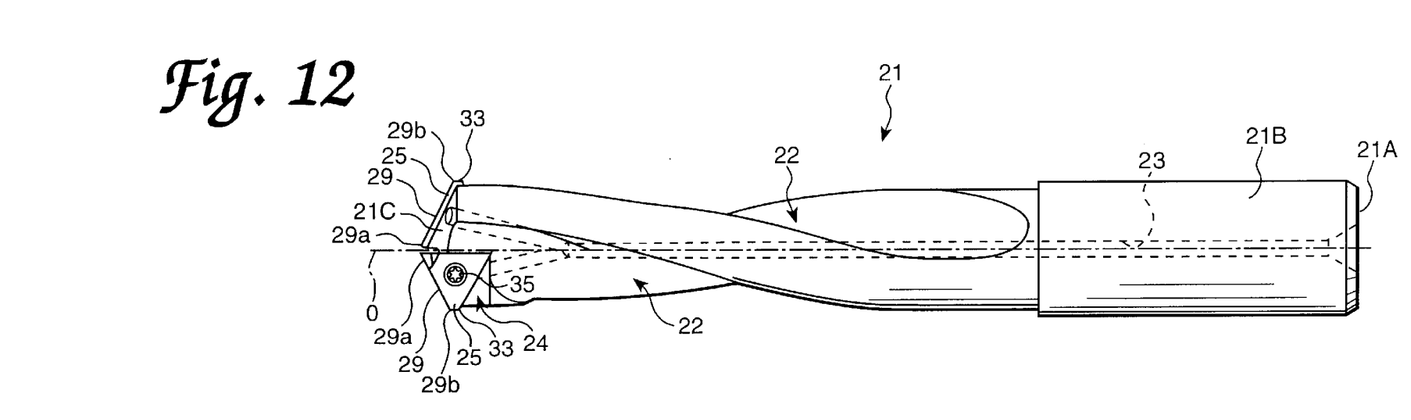
FIG. 12 is a plan view showing a fourth embodiment of the drill according to the present invention.
Figure 13:
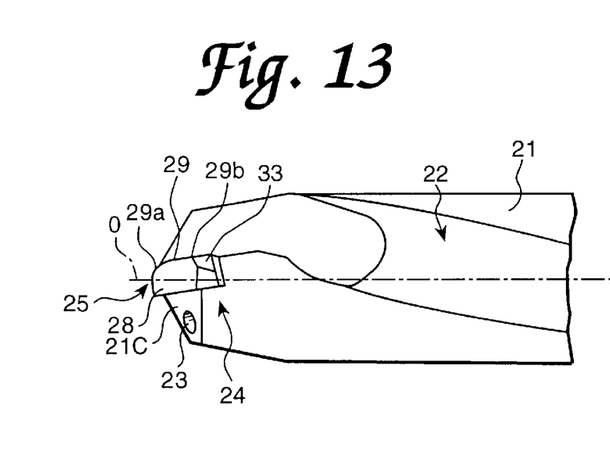
FIG. 13 is a side view of a distal end portion of the drill shown in FIG. 12.
Figure 14:
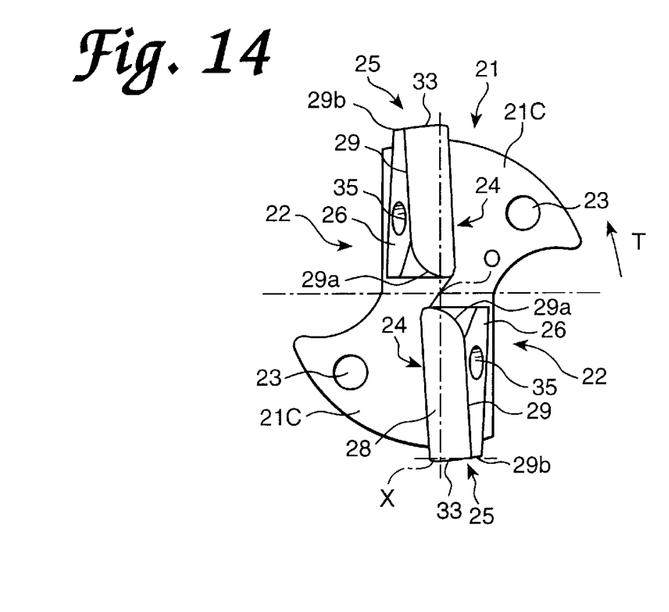
FIG. 14 is a front view of the distal end portion of the drill shown in FIG. 12.

FIGS. 12 to 14 show a drill according to a fourth embodiment of the present invention and FIGS. 15 to 20 show a throwaway tip according to a second embodiment of the present invention which is mounted to the drill of the fourth embodiment.

In the drill of this fourth embodiment, similarly to the drill of the first embodiment, a tool body 21 is formed into a substantially columnar shape about its axis O. The tool body 21 has a pair of chip ejection grooves 22 which are formed in an outer peripheral surface of its distal end portion in opposite relation about the axis O such that the chip ejection grooves 22 are opened to a distal end face 21C of the tool body 21 and extend toward the base (rear) end of the tool body 21 while twisting round the axis O backward in the rotating direction T of the tool. Also, a supply path 23 for a lubricating and cooling agent or the like is formed in the tool body 21 and extends from a base end face 21A of the tool body 21 toward the distal end thereof along the axis O through a shank 21 B. The supply path 23 is branched near the distal end of the tool body 1 into two paths which are opened to the distal end face 21C.

Further, tip mount seats 24 are formed at respective distal ends of the chip ejection grooves 22 such that each tip mount seat is defined in an inner wall surface of the chip ejection groove 22 facing in the rotating direction T and is recessed one step backward in the rotating direction T. A throwaway tip 25 according to the second embodiment of present invention is attached to each of the tip mount seats 24.

Figure 15:
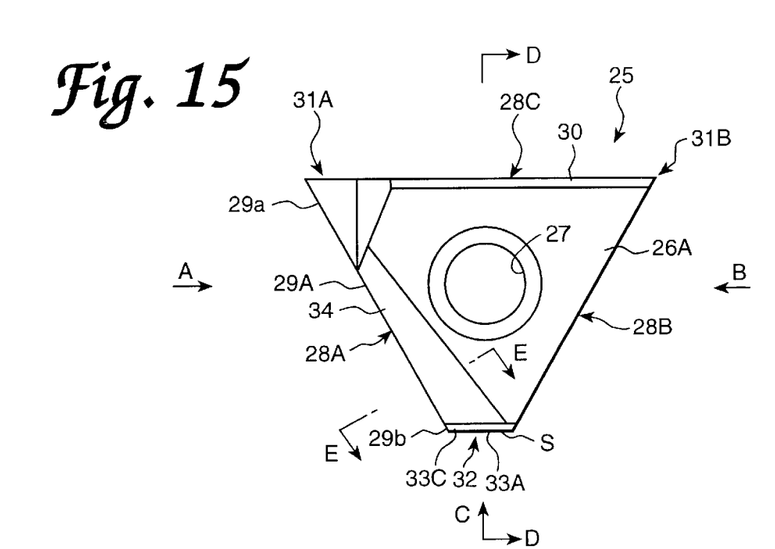
FIG. 15 is a plan view showing a second embodiment of the throwaway tip according to the present invention, the throwaway tip being mounted to the drill shown in FIG. 12.

The throwaway tip 25 is made of hard materials such as hard metal in the form of a substantially equilateral- triangular plate (more strictly, an isosceles-trapezoidal plate). At the center of each of two triangular surfaces 26 (26A, 26B) of the throwaway tip 25, a mount hole 27 is formed to penetrate the throwaway tip 5 in the direction of thickness thereof. One cutting edge 29A is defined along a ridge between one 26A of the triangular surfaces 26A, 26B and one 28A of three side faces 28 (28A, 28B, 28C) of the throwaway tip 25, and the other cutting edge 29B is defined along a ridge between the other triangular surface 26B and one side face 28A. Also, ridges between both the triangular surfaces 26A, 26B and the remaining one side face 8C are formed respectively to have chamfered portions 30. Additionally, in the throwaway tip 25 of the second embodiment, the one triangular surface 26A and the one side face 28A are formed to cross each other at a right angle through the one cutting edge 29A, and the other triangular surface 26B and the other one side face 28B are formed to cross each other at a right angle through the other cutting edge 29B.

Here, a corner 31A of the above one triangular surface 26A, at which the side face 28A and the side face 28C cross each other, is formed to curve as a whole toward the triangular surface 26B on the opposite side while drawing a convex cylindrical surface as it approaches the pointed end of the corner 31A. Correspondingly, a portion of the one cutting edge 29A near its one end 29a located in the corner 31A is also formed to curve in a convex shape relative to the other triangular surface 26B as it approaches the one end 29a. Likewise, a corner 31B of the other triangular surface 26B, at which the side face 28B and the side face 28C cross each other, is formed to curve as a whole toward the triangular surface 26A on the opposite side while drawing a convex cylindrical surface as it approaches the pointed end of the corner 31B. Correspondingly, a portion of the one cutting edge 29B near its one end 29a is also formed to curve in a convex shape relative to the one triangular surface 26A as it approaches the one end 29a.

Further, at the other ends 29b of the cutting edges 29, a crossing ridge or portion 32 between the one side face 28A and the other one side face 28B is cut away to span from the one triangular surface 26A to the other triangular surface 26B. Accordingly, corners 31C, 31D of both the is triangular surfaces 26A, 26B in the crossing portion 32 are formed to extend in the direction parallel to the remaining one side face 28C. With the corners 31C, 31D so truncated, the throwaway tip 25 is in the form of, strictly speaking, an isosceles-trapezoidal plate as stated above.

Figure 16:
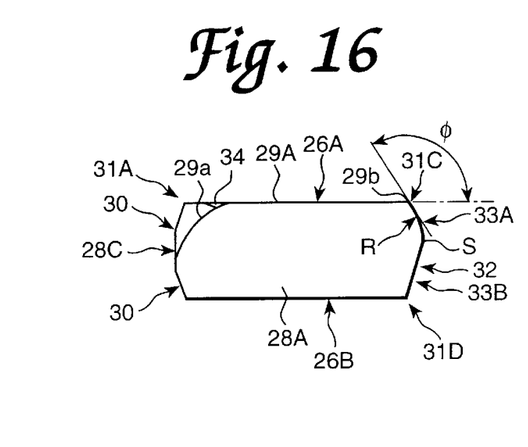
FIG. 16 is a front view of the throwaway tip shown in FIG. 15 as viewed in the direction of arrow A.
Figure 17:
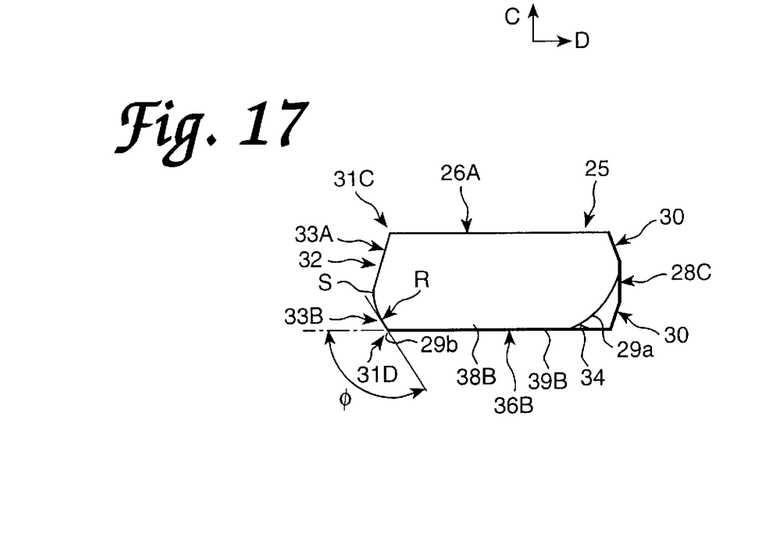
FIG. 17 is a rear view of the throwaway tip shown in FIG. 15 as viewed in the direction of arrow B.

In the crossing portion 32, one cylindrical surface 33A is formed on the side near the one triangular surface 26A, whereas the other cylindrical surface 33B is formed on the side near the other triangular surface 26B. The cylindrical surfaces 33A, 33B are formed to bulge outward of the throwaway tip 25 while drawing convex curves as they proceed from one of the triangular surfaces 26A, 26B to the other, i.e., in the direction of thickness of the throwaway tip 25. Also, each of the cylindrical surfaces 33A, 33B is formed to extend between the one side face 28A and the other one side face 28B. Here, as shown in FIGS. 16 and 17, the cylindrical surfaces 33A, 33B are formed such that they extend in the direction parallel to the side face 28C of the throwaway tip 25 and, looking in the directions opposed to the side faces 28A, 28B, they cross the cutting edges 29A, 29B at the same obtuse angle f at the other ends 29b thereof.

Figure 18:
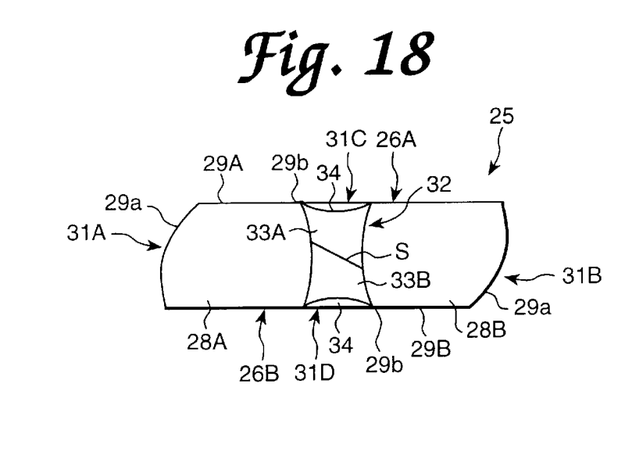
FIG. 18 is a side view of the throwaway tip shown in FIG. 15 as viewed in the direction of arrow C.
Figure 19:
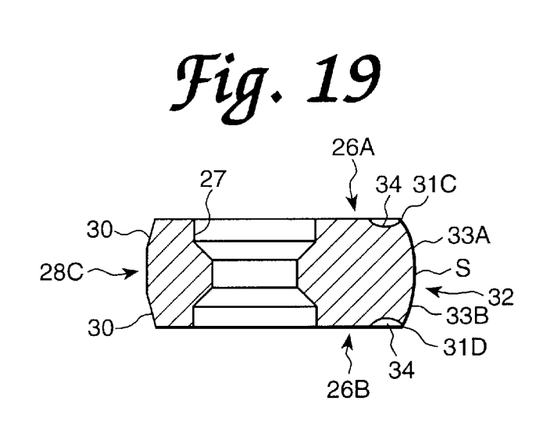
FIG. 19 is a sectional view of the throwaway tip shown in FIG. 15 taken along D—D.

Furthermore, as shown in FIG. 18, the cylindrical surfaces 33A, 33B in the throwaway tip 25 of this second embodiment are formed to have a width set such that the width of the one cylindrical surface 33A is gradually increased as it proceeds from the side face 28A to the side face 28B, and the width of the other cylindrical surface 33B is gradually increased as it proceeds from the side face 28B to the side face 28A. Accordingly, a crossing ridge S between the cylindrical surfaces 33A, 33B is defined to incline from the side of the triangular surface 26A to the side of the triangular surface 26B as it proceeds from the side face 28A to the side face 28B.

Figure 20:
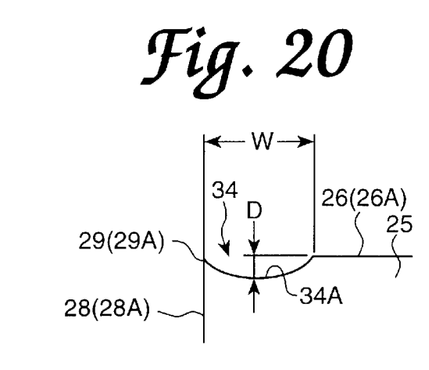
FIG. 20 is a sectional view of the throwaway tip shown in FIG. 15 taken along E—E.

In the throwaway tip 25 of this second embodiment and the drill of this fourth embodiment on which the throwaway tip 25 is mounted, chip breaker grooves 34 are formed in verge portions of the triangular surfaces 26A, 26B adjacent the cutting edges 29A, 29B to extend along the cutting edges 29A, 29B. As shown in FIG. 20, each of the chip breaker grooves 34 has a bottom surface 34A which is arcuate in cross-section perpendicular to the cutting edge 29. A width W of the chip breaker groove 34 is set to gradually increase from the side of the one end 29a to the side of the other end 29b of the cutting edge 29, and a depth D thereof is also set to gradually increase from the side of the one end 29a to the side of the other end 29a of the cutting edge 29.

The throwaway tip 25 of this second embodiment described above is attached to each of the tip mount seats 24 as follows. One of the triangular surfaces 26A, 26B is positioned as a rake face to face in the rotating direction T of the tool, and the side face 28 adjacent the one triangular surface, as a rake face, through the cutting edge 29 is positioned as an end flank to face the side of the tool distal end. Further, the cutting edge 29 is located such that the one end 29a is positioned at the distal end of the tool body 21 near the center of rotation of the drill, and the other end 29b is positioned to project radially outward of the distal end portion of the tool body 21. Then, the throwaway tip 5 is fixed to the tool body 21 by tightening a clamp screw 35 inserted through the mount hole 27. The drill of the fourth embodiment is thus assembled.

In the drill of the fourth embodiment, the throwaway tip 25 is located such that the above remaining one side face 28C extends parallel to the axis and the cutting edge 29 located at the distal end of the drill is given a negative axial rake angle and a negative radial rake angle. Note that the throwaway tips 25 attached to the tip mount seats 24 are the same in both size and shape and are mounted in symmetrical relation about the axis O. Therefore, the tip end angle defined by the cutting edges 29 positioned at the distal end of the drill is set to about 120°.

Moreover, in the above drill and the throwaway tip 25, one of the cylindrical surfaces 33A, 33B of the throwaway tip 25, which crosses the cutting edge 29 located at the distal end of the drill, is formed as a cylindrical surface coaxially disposed in relation to the axis O and having a radius equal to the distance from the axis O to the other end 29b of the cutting edge 29, i.e., the radius R of the cutting edge 29 of the drill. Accordingly, that one cylindrical surface 33 defines a margin which is positioned on the outer peripheral of the drill, extends in the direction of the axis O, and is given no flank angle. Because the cutting edge 29 is given a negative radial rake angle, the cylindrical surface 33 serving as a margin is located to curve toward the outer periphery of the drill projecting from an imaginary line X which passes the outer end 29b of the cutting edge 29 at the outer peripheral end thereof and extends perpendicularly to the cutting edge 29, as shown in FIG. 14, looking from the side of the drill distal end in the direction of the axis O. Consequently, the cylindrical surface 33 crosses the cutting edge 29 at the obtuse angle φ as stated above.

In the throwaway tip 25 thus constructed, since the chip breaker grooves 34 are formed in the verge portions of the triangular surfaces 26A, 26B, each serving as a rake face, adjacent the cutting edges 29 to extend along the cutting edge 29 such that each chip breaker groove has a width and a depth both gradually increasing toward the other end 29b of the cutting edge 29 (i.e., toward the outer periphery of the drill), the drill mounting the throwaway tip 25 thereon can develop a strong chip breaking action upon. In particular, chips are produced long on the radially outer side of the cutting edge 29 due to a difference in radius of rotation. It is thus possible to surely break off such a long chip and achieve efficient chip treatment.

While the above illustrated throwaway tip 25 has the chip breaker grooves 34 each formed to have a width and a depth both gradually increasing toward the other end 29b of the cutting edge 29, as mentioned above, the chip breaking action developed on the outer peripheral side of the drill can also be intensified by, for example, forming the chip breaker groove having a gradually increased width with a depth kept constant, or forming the chip breaker groove having a gradually increased depth with a width kept constant. From the viewpoint of achieving more positive and efficient chip treatment, however, it is desired that the chip breaker groove 34 is formed to have its width W and its depth D both gradually increasing toward the other end 29b of the cutting edge 29 as with the throwaway tip 25 of the second embodiment.

Figure 21:
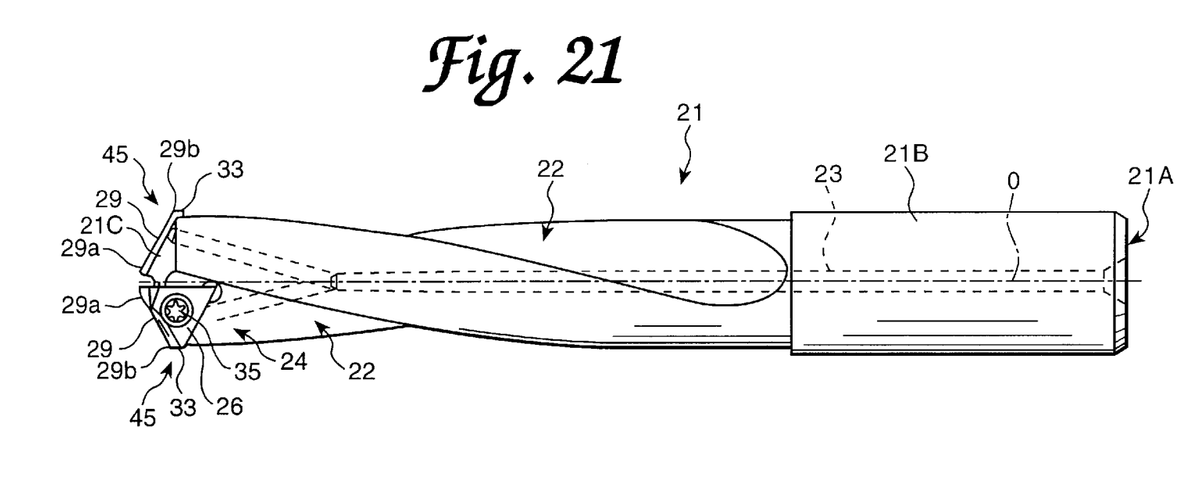
FIG. 21 is a plan view showing a fifth embodiment of the drill according to the present invention.
Figure 22:
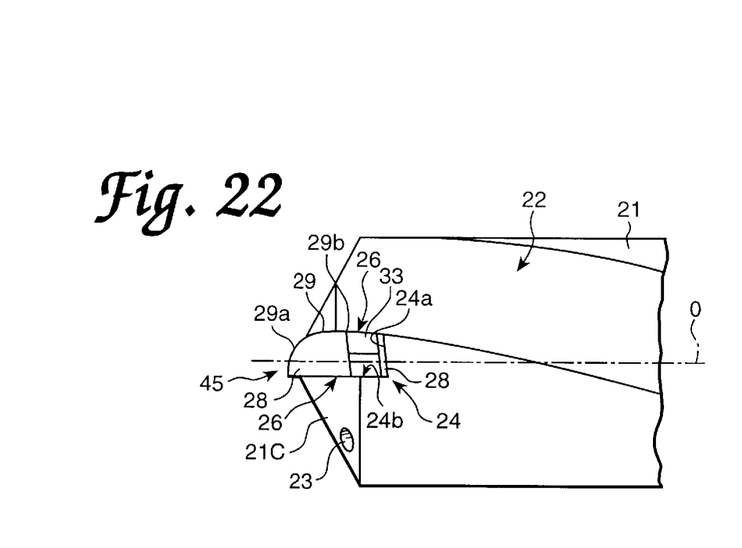
FIG. 22 is a side view of a distal end portion of the drill shown in FIG. 21.
Figure 23:
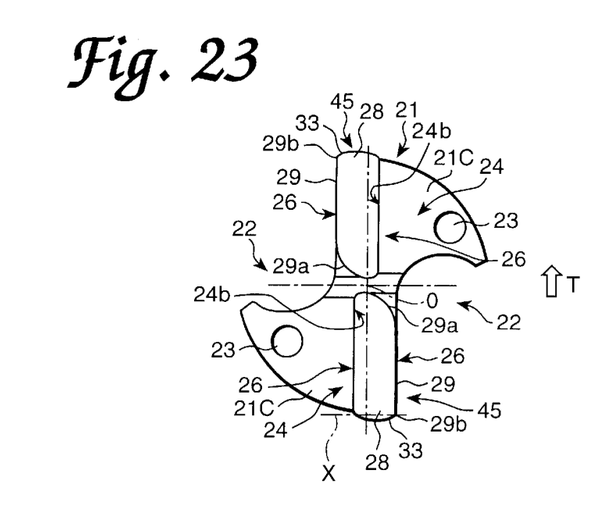
FIG. 23 is a front view of the distal end portion of the drill shown in FIG. 21.
Figure 24:
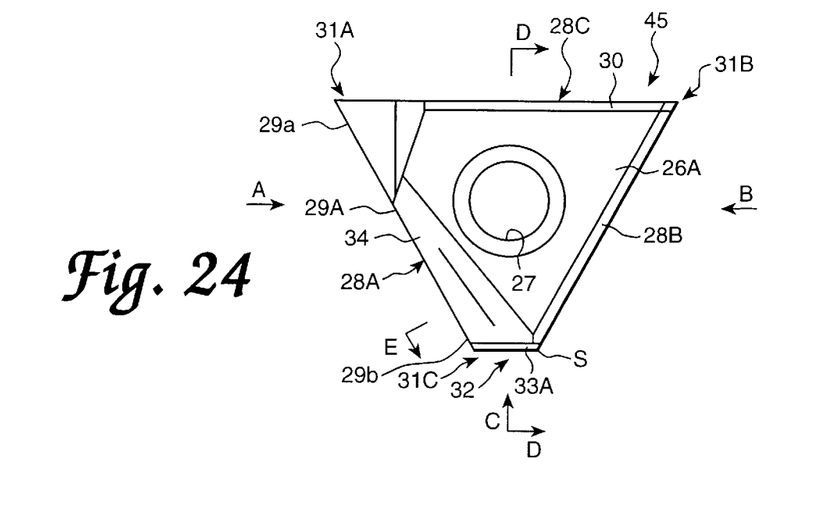
FIG. 24 is a plan view showing a third embodiment of the throwaway tip according to the present invention, the throwaway tip being mounted to the drill shown in FIG. 21.
Figure 25:
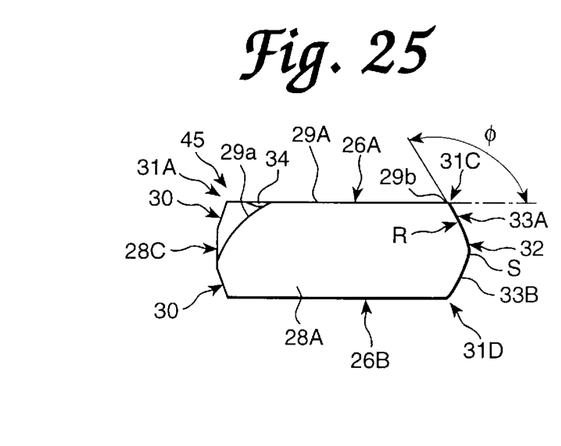
FIG. 25 is a front view of the throwaway tip shown in FIG. 24 as viewed in the direction of arrow A.
Figure 26:
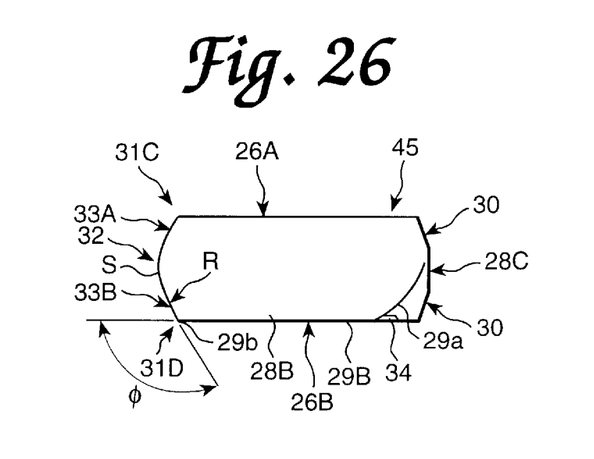
FIG. 26 is a rear view of the throwaway tip shown in FIG. 24 as viewed in the direction of arrow B.

FIGS. 21 to 23 show a drill according to a fifth embodiment of the present invention and FIGS. 24 to 29 show a throwaway tip 45 according to a third embodiment of the present invention which is mounted to the drill of the fifth embodiment. Note that components common to those in the drill of the above fourth embodiment and the throwaway tip 25 of the above second embodiment are denoted by the same reference numerals and will not be described below.

The one triangular surface 26A and the other triangular surface 26B of the throwaway tip 45 cross the one side face 28A and the other side face 28B at an acute angle through the one cutting edge 29A and the other cutting edge 29B, respectively, and a wall surface 24a of the tip mount seat 24 facing the side of the drill distal end is formed, as shown in FIG. 22, to incline toward the side of the drill base end as it approaches a bottom surface 24b of the tip mount seat 24.

Figure 27:
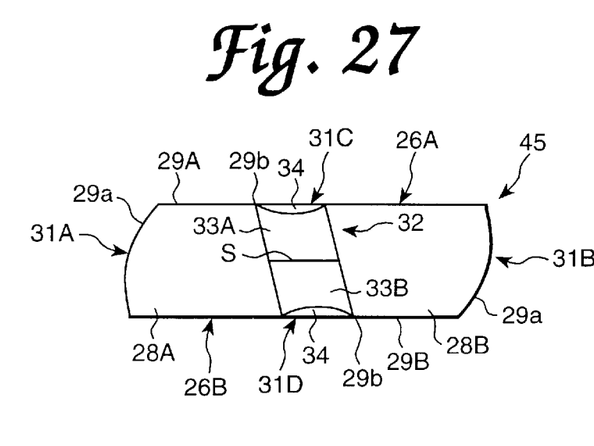
FIG. 27 is a side view of the throwaway tip shown in FIG. 24 as viewed in the direction of arrow C.
Figure 28:
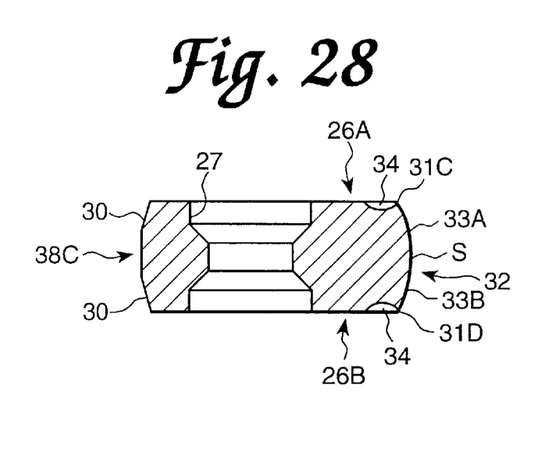
FIG. 28 is a sectional view of the throwaway tip shown in FIG. 24 taken along D—D.
Figure 29:
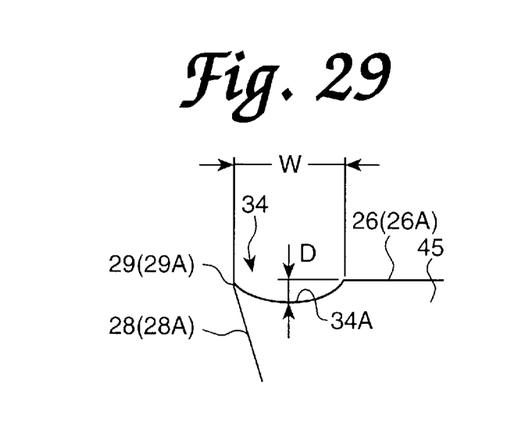
FIG. 29 is a sectional view of the throwaway tip shown in FIG. 24 taken along E—E.

Furthermore, as shown in FIG. 27, the cylindrical surfaces 33A, 33B of the throwaway tip 45 have a width set substantially constant between the side face 28A and the side face 28B. Accordingly, the crossing ridge S between the cylindrical surfaces 33A, 33B is defined to extend in a direction perpendicular to the direction of thickness of the throwaway tip 45, as shown in FIG. 27. Also, in the drill of this fifth embodiment, two throwaway tips 45 are arranged such that the one ends 29a of the cutting edges 29 provided by the radially inner ends thereof are spaced from each other in the radial direction of the drill with the axis O therebetween. As a result, similarly to, e.g., the drill of the first embodiment, the cutting edges 29 are absent from the axis O of the drill and a produced columnar core is twisted off in the course of cutting.

The drill of this fifth embodiment described above have advantages as follows. The side face 28 of the throwaway tip 45, which faces the side of the drill base end when attached to the tip mount seat 24, inclines toward the side of the drill base end as it approaches the triangular surface 26 seated on the bottom surface 24b of the tip mount seat 24. Accordingly, with the side face 28 of the throwaway tip 45 abutting against the wall surface 24a of the tip mount seat 24, the throwaway tip 45 is tightly fixed to the tip mount seat 24. In other words, because of the triangular surface 26 and the side face 28 crossing at an acute angle, the throwaway tip 45 can be mounted in a condition where the side face 28 facing the side of the drill base end is held against the wall surface 24a of the tip mount seat 24 which is inclined as described above. Therefore, when the throwaway tip 45 is pushed toward the side of the drill base end by the cutting force (component of feed force) caused during the drilling, the aforesaid side face 28 and the triangular surface 26, as a seating surface, of the throwaway tip 45 are brought into fit between the wall surface 24a and the bottom surface 24b of the tip mount seat 24 in a like manner as striking a wedge. As a result, the throwaway tip 45 can be more firmly held in place.

Moreover, in the above throwaway tip 45, since the triangular surfaces 26A, 26B each serving as a rake face in use and the side faces 28A, 28B crossing the triangular surfaces 26A, 26B through the cutting edges 29A, 29B and each serving as an end flank in use are formed to cross each other at an acute angle, the side face 28 as an end flank can be given a flank angle even when the triangular surface 26 as a rake face is arranged in the direction parallel to the axis O or in a direction to incline backward in the rotating direction T of the drill as it comes closer to the side of the tool base end. This enables the cutting edge 29 used in drilling to have an axial rake angle of 0° or a positive value. Therefore, chips produced by the cutting edge 29 are prevented from being pushed in the rotating direction T unlike the case where the cutting edge has a negative axial rake angle. Thus, the chips are smoothly guided along the triangular surface 26 as a rake face, promptly received in the chip ejection grooves 22, and then ejected toward the side of the tool base end. Consequently, efficient chip treatment can be achieved.

The foregoing description has been made in connection with the case of mounting the throwaway tips 5, 25, 45 according to the first to third embodiments of the throwaway tips on the drills. However, any of the throwaway tips of the throwaway type can also be employed as a throwaway tip for, e.g., another type of drilling tool, such as a boring bar, or a bit used in turning work. In particular, when the throwaway tip of the present invention is employed as a throwaway tip for another type of drilling tool, the burnishing effect due to the cylindrical surfaces 15, 33 can be achieved likewise. Also, when it is employed as a throwaway tip for turning work, the strength of the cutting edges 9, 29 can be increased at both the ends 9a, 9b, 29a, 29b.

Furthermore, when the throwaway tips 25, 45 of the present invention are employed in turning work, e.g., deep cutting, the chip breaker groove 34 enables chips, which are produced long on the outer peripheral side of a workpiece due to a difference in radius of rotation, to be efficiently treated as with the application to drills, by positioning the one end 29a of the cutting edge on the inner peripheral side of the rotating workpiece (i.e., the infeed side) and positioning the other end 29b on the outer peripheral side thereof.

What is claimed is:

1. A drill including a substantially columnar tool body having an axis, the drill comprising:

a pair of chip ejection grooves formed in an outer peripheral surface of the tool body, a recess communicating with the pair of chip ejection grooves;

a pair of cutting edges provided at respective distal ends of the pair of chip ejection grooves, wherein:

the pair of cutting edges have radially inner ends located in positions slightly offset from the axis radially outward, the recess extends along the axis while passing a gap between the radially inner ends, and has a bottom surface facing a distal end of the tool body, and the bottom surface of the recess comprises one slope and another slope, the one slope obliquely crossing the axis in a position aligned with the axis and inclining toward one of the pair of chip ejection grooves as the one slope proceeds to a side near a base end of the tool body, and the other slope crossing the one slope on a side near the distal end of the tool body and inclining toward another one of the pair of chip ejection grooves as the other slope proceeds to the side near the base end of the tool body.

2. The drill according to claim 1, wherein a distance from a distal end of one of the pair of cutting edges to a crossing point between the one slope and the axis in a direction along the axis is in a range of 1 mm to 10 mm.

3. The drill according to claim 1, wherein an inclination angle formed by the one slope with respect to the axis at a crossing point between the one slope and the axis is in a range of 30° to 75°.

4. The drill according to claim 1, wherein the one slope is formed into a flat surface.

5. The drill according to claim 1, wherein the one slope is formed into a curved surface.

6. A throwaway tip being in a form of a substantially triangular plate, comprising:

two triangular surfaces;

three side faces; and a cutting edge, wherein:

one of the two triangular surfaces serves as a rake face, one of the three side faces serves as a flank, and the cutting edge is defined along a ridge between the rake face and the flank, the cutting edge includes a portion near one end thereof formed to incline toward another one of the two triangular surfaces while drawing a convex shape as the cutting edge approaches the one end, and the cutting edge having a portion near the other end thereof which includes at least one cylindrical surface formed, in a crossing ridge portion between the one of the three side faces and another one of the three side faces adjacent to the one of the three side faces, to extend from the one side face of the three side faces to the other one of the three side faces while drawing a convex shape from the one of the two triangular surfaces to the other one of the two triangular surfaces.

7. The throwaway tip according to claim 6, wherein the rake face and the end flank cross each other at an acute angle.

8. The throwaway tip according to claim 6, wherein the at least one cylindrical surface is formed in a direction to cross the cutting edge at an obtuse angle.

9. The throwaway tip according to claim 6, wherein a chip breaker groove is formed in a verge portion of the rake face adjacent to the cutting edge, the chip breaker groove having a width gradually increasing from a side near the one end of the cutting edge to a side near the other end of the cutting edge.

10. The throwaway tip according to claim 6, wherein a chip breaker groove is formed in a verge portion of the rake face adjacent to the cutting edge, the chip breaker groove having a depth gradually increasing from a side near the one end of the cutting edge to a side near the other end of the cutting edge.

11. A drill including a tool body having an axis, the drill being rotatable about the axis, the drill comprising:

a throwaway tip being in a form of a substantially triangular plate having two triangular surfaces and three side faces, the throwaway tip being detachably attached to a distal end portion of the tool body, wherein:

one of the two triangular surfaces being positioned as a rake face to face in a direction of rotation, one of the three side faces being positioned as an end flank to face the distal end of the tool body, the throwaway tip having a cutting edge defined along a ridge between the rake face and the end flank, the cutting edge having one end positioned near a center of rotation of the distal end of the tool body and another end positioned at an outer periphery of the tool, the cutting edge having a portion near the one end thereof, being formed to incline backward in the direction of rotation while drawing a convex shape as the cutting edge approaches the one end, and the cutting edge having a portion near the other end thereof which includes a cylindrical surface formed in a crossing ridge portion between the one of the three side faces and another one of the three side faces adjacent to the one of the three side faces, extending in a direction of the axis and coaxially with the axis.

12. The drill according to claim 11, wherein the rake face and the end flank cross each other at an acute angle.

13. The drill according to claim 11, wherein the cylindrical surface is formed in a direction to cross the cutting edge at an obtuse angle.

14. The drill according to claim 11, wherein a chip breaker groove is formed in a verge portion of the rake face adjacent to the cutting edge, the chip breaker groove having a width gradually increasing from a side near the one end of the cutting edge to a side near the other end of the cutting edge.

15. The drill according to claim 11, wherein a chip breaker groove is formed in a verge portion of the rake face adjacent to the cutting edge, the chip breaker groove having a depth gradually increasing from a side near the one end of the cutting edge to a side near the other end of the cutting edge.

16. The throwaway tip according to claim 6, wherein:

the other one of the two triangular surfaces serves as another rake face, the other one of the three side faces serves as another flank, and another cutting edge is defined along a ridge between the other rake face and the other flank, and two cylindrical surfaces of the at least one cylindrical surface are formed in the crossing ridge portion between the one of the three side faces and the other one of the three side faces, one of the two cylindrical surfaces being formed in a direction to cross the cutting edge at a predetermined angle, another one of the two cylindrical surfaces being formed in a direction to cross the other cutting edge at the predetermined angle.

* * * * *